United States Patent Office 2,821,556
Patented Jan. 28, 1958

2,821,556

PROCESS FOR AMINE SALT ISOLATION

Kenneth Goodemoot, South Bound Brook, and Robert Louis Horton, Bound Brook, N. J., assignors to American Cyanamid Company, New York, N. Y., a corporation of Maine No Drawing. Application September 26, 1956
Serial No. 612,119

10 Claims. (Cl. 260—570.6)

This invention relates to an improved method for the isolation of 1-cyclohexyl-3-diethylamino-1-phenylpropanol-1 and its hydrochloride, by the use of certain liquid polychlorinated aliphtaic hydrocarbon solvents.

1-cyclohexyl-3-diethylamino-1-phenylpropanol-1 is an important intermediate in the preparation of a therapeutic agent, 1-cyclohexyl-3-diethylamino-1-phenylpropanol-1 ethiodide. This therapeutic agent is useful as a gastric secretion inhibitor in the treatment of stomach ulcers and other gastric disorders involving excess gastric secretion. It is prepared from 1-cyclohexyl-3-diethylamino-1-phenylpropanol-1 by reaction with ethyl iodide. Because of the importance of this therapeutic agent, any mode of operation in the steps in its preparation which increases the overall yield is of the utmost importance. Pharmaceutical products of this nature are prepared by a number of steps, some of which do not give good yields and it is imperative that every amount of the product of anyone of these steps be isolated. Otherwise the end product may become too expensive for extensive use.

1-cyclohexyl-3-diethylamino-1-phenylpropanol-1 is prepared by the treatment of beta-diethylaminopropiophenone with a cyclohexyl magnesium halide in a Grignard reaction. The cyclohexyl magnesium halide (the chloride is usually used) is reacted with beta-diethylaminopropiophenone in an ether such as dibutyl ether or diethyl ether. After the reaction is complete, the mixture is drowned in a hydrochloric acid ice mixture to decompose excess Grignard reagent. It is imperative that an efficient yet inexpensive method of isolation of the product from this drowned mixture be used.

In the past, several methods have been used to isolate 1-cyclohexyl-3-diethylamino-1-phenylpropanol-1 from the drowned Grignard reaction mixture. In one of these, the mixture is basified with ammonium chloride and ammonium hydroxide. The ether layer containing the free amine is then drawn off. It has been necessary to extract the aqueous layer again with ether to recover a further portion of the amine. The combined ether extracts are then distilled to isolate 1-cyclohexyl-3-diethylamino-1-phenylpropanol-1. This process has very serious disadvantages. In the first place, the presence of large amounts of magnesium ion causes the formation of a very gelatinous precipitate upon basification. Consequently, the manipulation of this mixture becomes very difficult. On top of this there is the necessity for the extra extractions. The manipulations and the materials involved in this extra step add to the operating costs.

An alternative method of isolating the 1-cyclohexyl-3-diethylamino-1-phenylpropanol-1 involves filtration of the drowned mixture. The amine hydrochloride precipitates from the drowned mixture and is filtered off without separation of the ether layer. The crude amine hydrochloride is then dried, dissolved in water, clarified and the solution is then made alkaline by the addition of a base such as ammonia. The free amine is then extracted from the water with an organic solvent such as isopropyl acetate and is isolated by removal of the solvent by distillation of the extract. The high solubility of the amine hydrochloride in water causes severe losses in this method. The product does not completely precipitate and an appreciable proportion of the amine hydrochloride remains in the aqueous layer of the drowned reaction mixture. In addition, the temperature in the drowning mixture is critical in the formation of the amine hydrochloride precipitate. Temperatures above approximately 12° C. must be avoided and this requires a very slow drowning over an extensive period of time.

We have discovered that the hydrochloride of 1-cyclohexyl-3-diethylamino-1-phenylpropanol-1 may be directly extracted from the drowned Grignard reaction mixture, after removal of the ether layer, with a liquid polychlorinated aliphatic hydrocarbon solvent such as chloroform or tetrachloroethane. It is an advantage of the process of our invention, that the amine hydrochloride is obtained in higher yields than in the methods previously used.

It is a further advantage of the process of our invention that the manipulations are simplified. The amount of hydrochloric acid-ice mixture used in the slurry is not critical. The drowning temperature can be allowed to rise as high as 35° C. permitting very much more rapid drowning. The extremely slow filtration of the amine hydrochloride is eliminated as are the extra steps involved in redissolving the hydrochloride in order to liberate the base. The extraction in the process of our invention is run on the acid side, thus avoiding the presence of large quantities of a bulky gelatinous magnesium hydroxide precipitate.

In the practice of our invention, the Grignard reaction is drowned in at least about 1.5 parts of hydrochloric acid-ice mixture containing excess hydrochloric acid per part of Grignard reaction mixture. The ether layer is separated. Since this is done on the acid side, there is no trouble from an emulsion formation such as is found in one of the processes of the prior art when layers are separated from the alkaline mixture containing magnesium hydroxide. The aqueous layer is then extracted with chloroform or tetrachlorethane. The chloroform may be completely distilled off the separated extract leaving the amine hydrochloride, or, alternatively, the amine hydrochloride may be isolated by partial concentration of the chloroform extract, followed by precipitation with another solvent. The free amine can be obtained directly from the chloroform extract, if desired, by washing the extract with a water soluble alkaline reagent, followed by separation of the aqueous layer. Because of its high solubility in chloroform, ammonia is the preferred alkaline reagent, but any other basic reagent more basic than the 1-cyclohexyl-3-diethylamino-1-phenylpropanol-1 will suffice. The chloroform solution of the free amine is then dried and evaporated to give the free 1-cyclohexyl-3-diethylamino-1-phenylpropanol-1.

The process of our invention is a most surprising result. Amine hydrochlorides are well known to be very soluble in water. Normally this is the way in which an amine is brought into aqueous solution, at least in those cases where the amines are themselves water insoluble. In organic solvents, especially water immiscible ones, amine hydrochlorides have far less solubility, usually none at all. The principles of the Law of Partition lead one to expect that the distribution of an amine hydrochloride between a solvent and water would be very much in favor of the aqueous layer since the relative solubility of an amine hydrochloride is so much higher in water than in a water insoluble solvent. It is therefore most surprising to find that this particular amine hydrochloride has such excellent solubility in chloroform or tetrachlorethane that practically a complete extraction of the amine hydrochloride from an aqueous acid medium can be obtained. It would be surprising that even with several extractions, this could be achieved and it is even more surprising to find that one extraction removes practically all the amine hydrochloride. This means that the hydrochloride of 1-cyclohexyl-3-diethylamino-1-phenylpropanol-1 is much more soluble in these organic solvents than it is in the aqueous layer. This result is even more surprising because a very closely related pharmaceutical agent 1-cyclohexyl-1-phenyl-3-N-piperidyl propanol hydrochloride, which is prepared by a similar Grignard reaction of (1-piperidyl) propiophenone, can not be extracted in this way with chloroform or ethylene dichloride, although the only difference between the structures of these two compounds is that in the related drug, the two ethyl groups of 1-cyclohexyl-3-diethylamino-1-phenylpropanol-1 are joined at their ends through a methylene bridge. The related drug has the normally expected great predominance of water solubility for its amine hydrochloride, whereas the amine of the present invention has a predominance of chloroform or tetrachloroethane solubility which permits its extraction from the aqueous medium. This selective solubility of the hydrochloride of 1-cyclohexyl-3-diethylamino-1-phenylpropanol-1 is peculiar to the polychlorinated aliphatic solvents used in our invention since with other solvents such as for example, the dibutyl ether used in the Grignard reaction, the relative solubilities are such that little if any of the amine hydrochloride is to be found in the butyl ether layer. This preference of amine hydrochlorides for the aqueous layer is the normal and expected state of affairs and the behavior which we have found for the amine hydrochloride of this invention with specific solvents is distinctly abnormal and unexpected.

The nature of the solvent is, as with many unusual results, very specific. A survey of many related solvents, such as ethylene dichloride or dibromide, tetrabromoethane, carbon tetrachloride, 1,1,2-trichloroethane, 1,1,1-trichloroethane, reveals that these have deficiencies making them unusable. In general, the solubility of the hydrochloride of 1-cyclohexyl-3-diethylamino-1-phenylpropanol-1 is from one-third to one-seventh that in chloroform and tetrachloroethane, requiring the handling of much larger quantities of solvent. By tetrachloroethane is meant the symmetrical isomer 1,1,2,2-tetrachloroethane. However, commercial crude products from the chlorination of acetylene, having the above isomer as the principal constituent, can be used equally as well. Any technical grade of chloroform is usable in our process.

The minimum quantity of solvent recommended for the extraction is the quantity sufficient to dissolve all the amine hydrochloride present. In both cases, the solubility in a saturated solution is about two parts of amine hydrochloride in nine parts of solvent, by weight. Since a mol of amine hydrochloride is 326 parts, the minimum usage per mol is 4.5 times this or 1470 parts per mol. Lesser amounts can be used for one extraction, but additional will be needed, totalling to a minimum of 1470 parts per mol of hydrochloride before any semblance of complete extraction will be possible. Larger total quantities can be used, either in any individual extraction, or preferably, as separate batches to complete the extraction of the last traces of product.

Our invention can be further illustrated by the following examples.

Example 1

Two and one-tenth (2.1) mols of cyclohexyl magnesium chloride in dibutyl ether are reacted with 0.7 mols of beta-diethylaminopropiophenone in dibutyl ether. After completion of the reaction the reaction mixture is divided into two equal portions and each portion is drowned in ice-hydrochloric acid mixture.

One portion of the above is allowed to stand at 10° C. for complete precipitation of the amine base hydrochloride. The crude hydrochloride which formed is removed by filtration. This filtration proceeds extremely slowly and requires extended periods of time. The crude filter cake consisting of 1-cyclohexyl-3-diethylamino-1-phenylpropanol-1-hydrochloride is then dissolved in 15 parts of water, made alkaline and extracted with isopropyl acetate. The extract is dried with $Na_2SO_4$, filtered and then acidified with alcoholic hydrochloric acid, precipitating the amine base as the hydrochloride. The hydrochloride obtained (M. P. 184.3–185.5° C.) represent a 22% theory yield. A second crop is obtained from the reaction mixture making a combined yield of 26.4% theory, based on the ketone.

The second drowned portion is treated by removal of the dibutyl ether (30–35° C.) layer. This is washed with water and the water washings are added to the aqueous layer. The aqueous layer is then extracted with three 70 ml. portions of chloroform and the chloroform extracts are combined. The chloroform is then removed by distillation until only 100 parts remain and the 1-cyclohexyl-3-diethylamino-1-phenylpropanol-1 hydrochloride is precipitated by the addition of 160 parts of acetone. By this procedure a 32.4% yield of the amine hydrochloride is obtained.

Example 2

A Grignard reaction product mixture prepared as described under Example 1 (prepared from 52 parts of magnesium and 0.71 mol-parts of beta-diethylaminopropiophenone) is added to 2.5 parts of ice in 290 parts by volume of concentrated hydrochloric acid. This is agitated over a one hour period at a temperature below 35° C. After agitation of the mixture, the dibutylether layer is separated, washed with water, and the water wash was added to the water layer. The aqueous layer is then extracted in succession with 200, 125, and 100 parts by volume portions of chloroform. The combined chloroform extracts are then treated with 50 parts by volume of concentrated aqueous ammonium hydroxide solution and 200 parts by volume of water and agitated for one hour at room temperature. The aqueous layer is then split off and washed once with 35 parts by volume of chloroform. The combined chloroform extracts are then subjected to distillation. After the chloroform has been removed the residue is distilled, giving 65 parts of the base.

Example 3

The procedure of Example 2 is followed except that tetrachlorethane is used in place of the chloroform. A similar yield of free amine is obtained.

We claim:

1. The process of recovering 1-cyclohexyl-3-diethylamino-1-phenylpropanol-1 hydrochloride from aqueous solutions thereof, which comprises extracting said aqueous solution with a liquid polychlorinated aliphatic hydrocarbon solvent selected from the group consisting of chloroform and tetrachloroethane.

2. The process of claim 1 in which the solvent is chloroform.

3. The process of claim 1 wherein the solvent is ethylene tetrachloride.

4. The process of claim 2 wherein the said cyclohexyl diethylamino phenylpropanol hydrochloride is isolated by evaporation of the said chloroform.

5. The process of claim 4 wherein the said amine hydrochloride is filtered from a partially evaporated extract.

6. The process of recovering 1-cyclohexyl-3-diethylamino-1-phenylpropanol-1 from aqueous solutions of the hydrochloride salt thereof, which comprises extracting the said aqueous solution with a liquid chlorinated aliphatic hydrocarbon solvent selected from the group consisting of chloroform and tetrachlorethane, separating the said extract, liberating the free amine by the addition of water soluble alkaline reagent more basic than the said cyclohexyl diethylamino phenylpropanol and isolating the said free amine by evaporation of the said solvent.

7. The process of claim 6 wherein the solvent is chloroform.

8. The process of claim 6 wherein the solvent is tetrachlorethane.

9. The process of claim 7 wherein the addition of an alkaline reagent is carried out by washing the said extract with an aqueous solution of said alkaline material.

10. The process of claim 9 wherein the said alkaline material is an ammonium hydroxide solution.

No references cited.